Dec. 13, 1955   R. A. BELL   2,727,140
PROXIMITY FUSE ADJUSTING MEANS
Filed Aug. 25, 1944
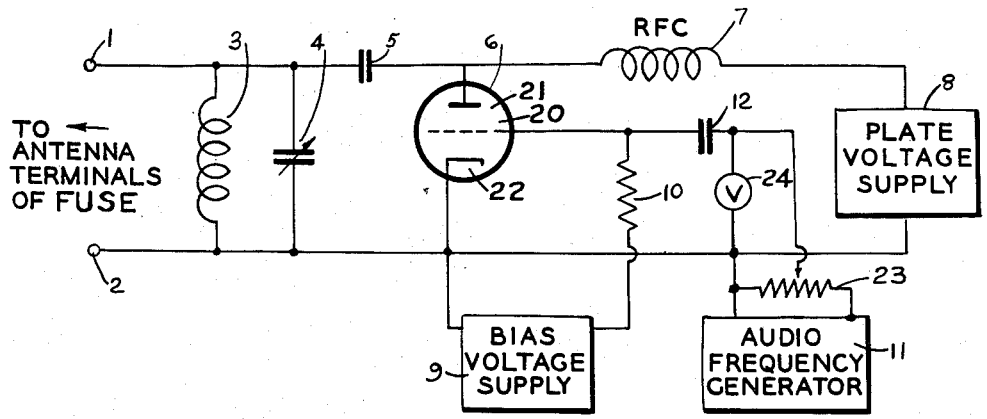
INVENTOR
Richard A. Bell
BY
Samuel Ostrolenk
ATTORNEY : 2,727,140
Patented Dec. 13, 1955

2,727,140
PROXIMITY FUSE ADJUSTING MEANS

Richard A. Bell, Lower Merion Township, Montgomery County, Pa., assignor, by mesne assignments, to Philco Corporation, Philadelphia, Pa., a corporation of Pennsylvania Application August 25, 1944, Serial No. 551,186

1 Claim. (Cl. 250—20)

My invention relates to a method of testing the operation of radio circuits, and more particularly a novel method of testing the radio circuit operation of a proximity fuse in order to determine at what height above the ground the fuse will be ignited.

A radio proximity fuse consists essentially of a small radio transmitter and a small radio receiver fastened to an aerial bomb. The receiver receives two signals; one signal directly from the transmitter and another signal which is a reflected signal from the earth. As the bomb approaches the earth, the increase in strength of the reflected signal changes the relative strength of the two signals. The receiver compares the strength of these two signals which is a measure of the height above ground of the aerial bomb, and when the signal that is reflected from the earth is sufficiently strong, the receiver fires a thyratron tube which in turn ignites the bomb fuse.

There are two ways in which the action of the signal of the receiver can be analyzed. Both of these methods lead to the same ultimate answer.

By the first method of analysis, the signal which is radiated from the transmitting antenna at a certain frequency when measured by an observer on the ground is a slightly higher frequency because of the falling motion of the bomb. This is the well known Doppler effect. This slightly higher frequency is reflected from the earth and is received by the receiving antenna on the bomb. Again, the well known Doppler effect causes the receiving antenna to receive a frequency slightly higher than the frequency measured by the observer on the ground.

As a result of this, the receiver is operated by two signals; one signal directly from the transmitter at the transmitter frequency and another signal reflected from the earth at a slightly higher frequency. The amount by which the frequency of this reflected signal is above the transmitted signal is determined solely by the speed of the falling bomb.

Such a bomb reaches a terminal velocity, that is, a constant maximum speed long before it reaches the earth, and consequently, since the bomb thereafter is falling at a uniform rate, the difference in frequency between the directly received signals and the reflected received signals is a constant. As the bomb approaches the earth, the intensity of the reflected received signals increases. When this reflected received signal reaches a predetermined amplitude, the receiver operates the thyratron.

In order to measure the strength of the reflected signal from the earth, the reflected signal is detected by a diode in the manner customary in radio circuits, to give a signal of the modulation frequency. The net signal is combined with the signal directly received from the transmitter. This combination produces a net signal which is a radio frequency signal modulated by a frequency which is the difference of the transmitted and reflected frequencies.

Thus, the directly received signal from the transmitter acts as a local oscillator signal. The output of the detector circuit will be a function of the frequency difference between the directly received and reflected signals, and the voltage output of the detector will be substantially proportional to the strength of the reflected received signal.

The output of this detector will also be at a frequency which is equal to the difference in frequency between the two incoming signals; that is, the signal from the transmitter and the signal reflection from the earth as measured at the bomb. This output from the receiver, which is usually of an audio frequency is amplified by an audio amplifier and is then applied to the grid of the thyratron tube which fires when the voltage on it reaches a certain amplitude.

In certain types of radio proximity fuses, the radio antenna which is used for the transmitter is also the antenna which is used for the receiver. In such a device the preceding analysis of operation of the device is still correct but another analysis yields a result which leads to the testing device which I have invented.

In this analysis the signals from the transmitter cause radio frequency currents to flow in the antenna. At the same time, a radio frequency voltage appears across the terminals of the antenna.

When the bomb is in free space, far from any reflecting object, the antenna current bears a certain relationship to the antenna voltage and I shall call the ratio of the voltage to the current the antenna impedance.

In greater detail, I shall define both the current and the voltage in the antenna as complex numbers in accordance with the theory used by radio engineers, and as a consequence, I obtain a complex impedance for the antenna. This complex impedance is composed of a resistance and a reactance. For the purposes of my invention, I shall presume that this resistance and this reactance are connected in parallel.

This assumption of a parallel connection is something which can always be done by proper algebraic manipulation of the complex quantities involved in the impedance formula.

Both theory and measurement of the antenna used on the radio proximity fuse show that the reactance of the antenna over a small band of frequencies in the neighborhood of the operating frequency behaves in the same manner as the reactance of a parallel circuit resonant at the operating frequency of the antenna.

Theoretically, this reactance results from those components of the electric and magnetic fields near the antenna which are not part of the radiation field. The resistance component of the antenna impedance results from the radiation of energy from the antenna.

In the neighborhood of the operating frequency of the antenna, this resistance varies but little with the frequency so I consider it to be substantially constant with regard to changes in the frequency of the operating of the unit.

Now, I consider that the bomb is suspended near a reflected object such as the ground. Now in addition to the current and voltage mentioned above in the antenna, the radio wave which is reflected from the ground induces a voltage and a current in the antenna. I shall call the voltage which was originally in the antenna when the antenna was far from any reflecting object the incident voltage and its corresponding current, the incident current. Likewise I shall call the voltage induced in the antenna by the wave reflected by the reflecting object or ground the reflected voltage and I shall call the current in the antenna induced by this reflected wave the reflected current.

In the antenna, the reflected and incident voltages combined together in a complex number fashion to obtain a net or total voltage in the antenna and the incident and reflected currents in the antenna combined together to give a net current in the antenna.

Electrically, the impedance of the antenna is defined as the ratio of the net voltage to the net current and since both of these have been altered from the values which have existed when the antenna of the bomb was far from any reflecting surface, it is to be expected that the impedance of the antenna will be different when the antenna is near a reflecting object.

From another viewpoint, it is theoretically possible to replace the reflecting earth by an image antenna placed beneath the earth and to remove the earth as an electrically active element in the system. This is commonly done by radio engineers as can be seen in the Radio Engineers' Handbook by Terman, page 775, Figure 8. This image antenna is excited by mutual impedance between it and the antenna on the bomb. This image antenna also acts as radiator and consequently, the mutual impedance must have a resistive component.

As the bomb approaches the surface of the earth in its flight downward, the phase of the reflected signal in the antenna changes. This variation in phase causes a cyclic variation in the impedance of the antenna.

This combination of an incident and a reflected signal to give a resultant impedance is treated, for example, in the February 1943 issue of Communications in a paper entitled An analysis of RF transmission lines by Hoadley. In Figure 8 of this paper, it is shown how the equivalent parallel resistance varies sinusoidly as the distance from the reflecting point changes.

In the bomb, this distance from the reflecting point decreases as the bomb approaches the earth causing a cyclical variation in the resistance component of the antenna impedance. Little variation occurs in the antenna reactance, however, since the reactance of the antenna composed, as it is, of the effect of the non-radiating part of the electric and magnetic fields near the antenna is small compared to the equivalent parallel reactance of the reflected wave. In consequence thereof, the small antenna reactance parallel with the large reflected wave reactance is substantially unaffected by the large and almost negligible parallel reactance of the reflected wave.

Consideration of the mutual impedance between the two antennae reveals a similar cyclicity. For example, Figure 13 of Terman's Radio Engineers' Handbook on page 780 shows the variation in mutual impedance for a specific pair of antennae. Similar cyclical variations would be obtained with any pair of mutually coupled antennae and although Figure 13 does not apply specifically to the antennae in question, it shows the general type of performance and reveals the cyclicity.

This mutual impedance of course must be combined with the self-impedance of the antenna in accordance with the Equation 6 on page 780 of Terman's Radio Engineers' Handbook in order to obtain the total impedance of the antenna itself. It becomes apparent, from this equation, that the cyclicity in variation of the mutual impedance will give a cyclical variation in the driving point impedance of the bomb antenna.

It will thus be clear that as the bomb falls, the impedance of the antenna goes through a cyclical variation. The amplitude of this cyclical variation is small when the bomb is high above the ground, but as it approaches the ground, the amplitude of this cyclical variation in antenna impedance becomes greater and greater. One cycle of this cyclical variation is gone through each time the bomb falls through a half a wave length of the transmitted frequency.

Inasmuch as at a certain point the bomb is falling at a uniform rate, the frequency from this point on of this cyclical impedance variation remains constant, but the amplitude of the changes in antenna impedance increase as ground is approached. This change in antenna impedance affects the detector circuit which actually measures the voltage across the antenna. As the impedance of the antenna changes, as outlined above, the voltage across the antenna changes correspondingly. The output of the detector then is an output which varies in accordance with the change in strength of the voltage across the antenna. This voltage is varying cyclically at the same rate that the antenna impedance is varying and it also increases its amplitude as the antenna impedance variation increases in amplitude. This is an audio frequency determined by the rate of fall of the bomb and increasing in amplitude as the bomb approaches earth. This audio signal is passed through an audio amplifier, the output of which is fed into a thyratron tube.

As the amplitude of this audio signal increases, the voltage fed to the thyratron tube increases, and when voltage on the thyratron tube reaches a predetermined value, the thyratron tube will fire, thus setting off the fuse. It is of course desired that the bomb shall explode at a definite height above earth. It will now be clear that the bomb explodes at a height at which the antenna impedance has a predetermined magnitude.

For commercial use, it is necessary to determine the percentage variations in antenna resistance occurring at any audio frequency rate required to fire the thyratron. The parameters of the circuit may then be adjusted so that at the impedance which the antenna will attain at a predetermined height above the ground the thyratron will be fired.

Heretofore, this calibration has been carried out in two steps. First, the input to the audio amplifier required to fire the thyratron is measured. Secondly, the output voltage of the diode is measured. Then the antenna resistance is changed by a definite amount, and the change in diode voltage resulting from this discrete change in antenna resistance is measured. Having these two measurements they were combined as follows. If S is the change in diode voltage per percent change in antenna resistance, and E is the peak audio voltage necessary to fire the thyratron, the percentage change in antenna resistance which is necessary to fire the thyratron is given by $$\frac{E}{S}$$

In practice, it was customary to first resonate the diode circuit with a normal dummy antenna and then to connect an additional resistance across the diode circuit; that is across the antenna, equal to ten times the equivalent parallel resistance of the antenna, and to then re-resonate the diode circuit. The change in diode voltage between these two conditions resulting from the 10% change in the antenna impedance was observed. Such a measurement has been found to be quite difficult because the 10% change in antenna resistance usually results in only a 3% change in diode voltage. In order to obtain a value of change in diode voltage of more than one significant figure, it was necessary to buck out about 90% of the diode voltage by means of an auxiliary source of voltage and to read the differential voltage on a more sensitive voltmeter scale. Such a method of measurement requires skilled operation and cannot be easily done by unskilled or semi-skilled operators.

Moreover, such a method does not provide a direct overall measurement of the performance of the fuse. Also, it does not provide an overall measurement which takes into account, the audio frequency variation of the antenna impedance.

I have found that a highly satisfactory method of performing an overall test of a radio proximity fuse that would determine the height above ground at which it will ignite can be achieved by simulating the actual variation of antenna resistance which it goes through in flight. This I effect by a dummy antenna with a resistance modulator, the resistance of which can be varied to whatever extent I may desire and at any audio frequency rate. The amplitude by which I vary the resistance of the dummy antenna will then simulate conditions met in actual flight at various altitudes of the bomb above ground, and the audio frequency rate at which I vary it will simulate the velocity conditions met in actual flight of the bomb.

In general, the device consists of a parallel tuned circuit to simulate the reactance of the antenna over a band of frequencies and a triode vacuum tube, the plate resistance of which is coupled across the two circuits to simulate the antenna resistance. I vary the plate resistance at an audio frequency rate by impressing on the grid of the triode an audio frequency voltage. This action occurs because the plate resistance of the triode is a function of grid voltage.

Accordingly, I have as an object of my invention to provide a novel circuit arrangement for proximity fuse calibration in which the actual conditions met in the flight of a bomb downwardly are electrically simulated.

This and other objects of my invention will be apparent from the detailed description made hereafter in connection with the drawings in which:

The single figure depicts, schematically, the resistance modulator which is to be used to simulate the actual antenna load.

The antenna terminals of the fuse are connected to terminals 1 and 2 of the circuit. The resonant circuit composed of inductor 3 and adjustable capacitor 4 is tuned to resonate at the transmitted frequency and is used to represent the antenna reactance over a band of frequencies. The capacitor 5 serves as a blocking capacitor to keep the direct current out of the fuse.

Tube 6 acts as the variable conductance in which the voltage applied to grid 20 controls the effective conductance between anode 21 and cathode 22. The plate voltage is supplied from the supply 8 and the grid bias voltage is supplied from the bias supply 9 through the resistor 10. Heater power to the cathode is supplied from an auxilliary power source not shown. The radio frequency choke 7 isolates the plate voltage supply from the tube as far as radio frequency is concerned.

As a result of these connections, the plate resistance of the tube is in shunt with the resonant circuit, and acts as the equivalent parallel resistance of the antenna. This plate resistance is a function of the grid voltage, and this is varied at an audio frequency by the audio frequency generator 11 coupled to the grid through capacitor 12. Consequently the conductance as seen from the terminals 1 and 2 varies at an audio frequency rate just as the antenna impedance would do were the bomb carrying the radio proximity fuse falling at its terminal velocity. Moreover, by raising the voltage of the audio frequency applied to the grid and by adjustment of rheostat 23 or by other suitable means, the circuit will simulate the increase in impedance variation of the actual antenna as the bomb approaches the earth.

This antenna impedance simulator can then be used to give an overall check on the operation of the radio proximity fuse. Instead of checking the behavior of two or more parts independently as has been done in the past, it enables an overall check to be made. The device can be calibrated by means that become obvious to radio engineers, so that a definite voltage, measured by voltmeter 24, supplied by the audio frequency generator at the proper frequency corresponds to a definite position above the ground. With this device, then overall performance from the antenna to the thyratron relay can be checked, and settings of adjustments can be made for a specific height of detonation.

In order to calibrate the device, I supply a steady direct current grid voltage and measure the equivalent parallel resistance at the frequency of the radio transmitter in the bomb. This is repeated for a series of different values of steady grid voltage and a graph plotted showing the functional relationship between the steady grid voltage and the equivalent parallel plate resistance. The operating point of the fuse, that is, the direct current voltage which will in free space be supplied to the grid of the vacuum tube which will result in the static impedance value about which the antenna impedance varies as the bomb falls, is then selected and at this point a tangent to the curve is drawn. The slope of this tangent then gives the change in antenna resistance in ohms per volt impressed upon the grid of the triode.

When it is desired to obtain a certain variation in antenna resistance, say P%, I divide the product of P and R, which is the resistance at the operating point, by the slope of the line and obtain the peak audio voltage which must be impressed on the grid of the triode in order to secure the desired antenna resistance change. This then enables me to set the audio oscillator at the frequency corresponding to the rate of fall of the bomb, and to set this voltage output at the voltage corresponding to the antenna of the bomb at a certain height above the ground. This enables determination of how the radio proximity fuse will operate, that is, whether or not the voltage necessary to fire the thyratron is secured at this particular height above ground.

Thus, by gradually increasing the voltage output of the audio frequency generator, I simulate the approach of the bomb to ground, and when the thyratron tube fires, the voltage on the voltmeter 24 is used to enter the calibration curve above described. From this curve, I determine the percent variation in resistance and thence the height at which the fuse will operate.

Various modifications of the principles of my invention will now be apparent to those skilled in the art, and accordingly I prefer not to be bound by the detailed description above, but by the appended claim.

In a system for testing the operation of a radio proximity fuse, an amplifying tube having a cathode, grid and anode, means for varying the conductance of said amplifying tube for simulating the time variation of the conductance of the antenna of said radio proximity fuse in actual use as said fuse moves in the direction of the earth, said means comprising a resonant circuit, tuned to resonate at the transmitted frequency connected across said antenna and to said cathode and anode to effect a parallel circuit connection with said amplifying tube, a radio frequency choke coil connected to said anode, means for supplying anode bias current to said anode through said radio frequency choke coil; means for supplying grid voltage bias to said grid, a source of audio frequency, a circuit connection from said last mentioned source to said grid, said connection comprising the sole signal circuit connection to said grid for varying the voltage on said grid solely at an audio frequency rate, said grid being substantially free of radio frequency potential, and means for measuring the amplitude of variation of said grid voltage.

References Cited in the file of this patent

UNITED STATES PATENTS

| | | |
|---|---|---|
| 1,702,067 | Willans | Feb. 12, 1929 |
| 1,911,362 | Hickok | May 30, 1933 |
| 2,193,361 | Rice | Mar. 12, 1940 |
| 2,341,243 | Schock | Feb. 8, 1944 |
| 2,715,725 | Jackson | Aug. 16, 1955 |